UNITED STATES PATENT OFFICE.

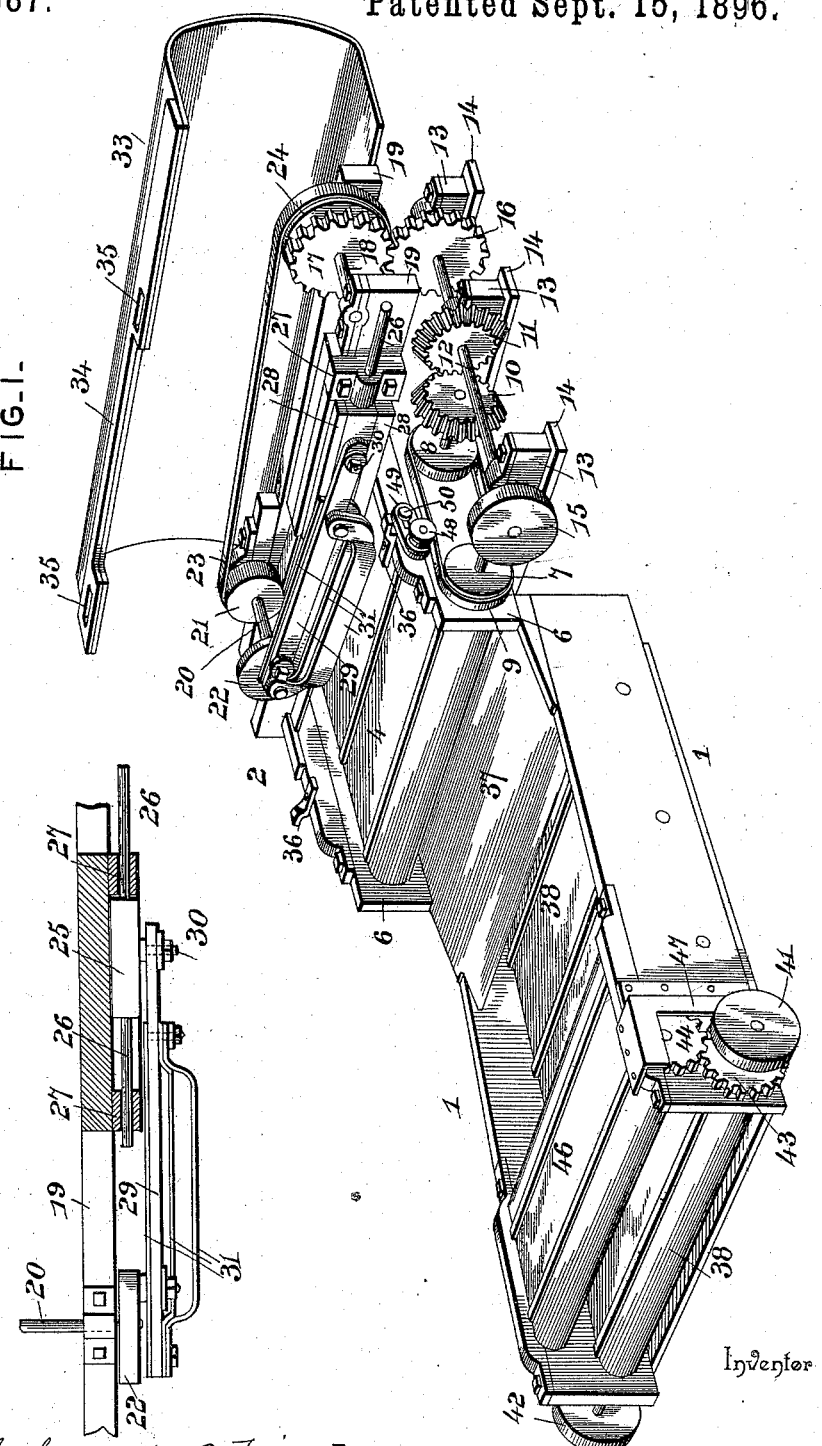

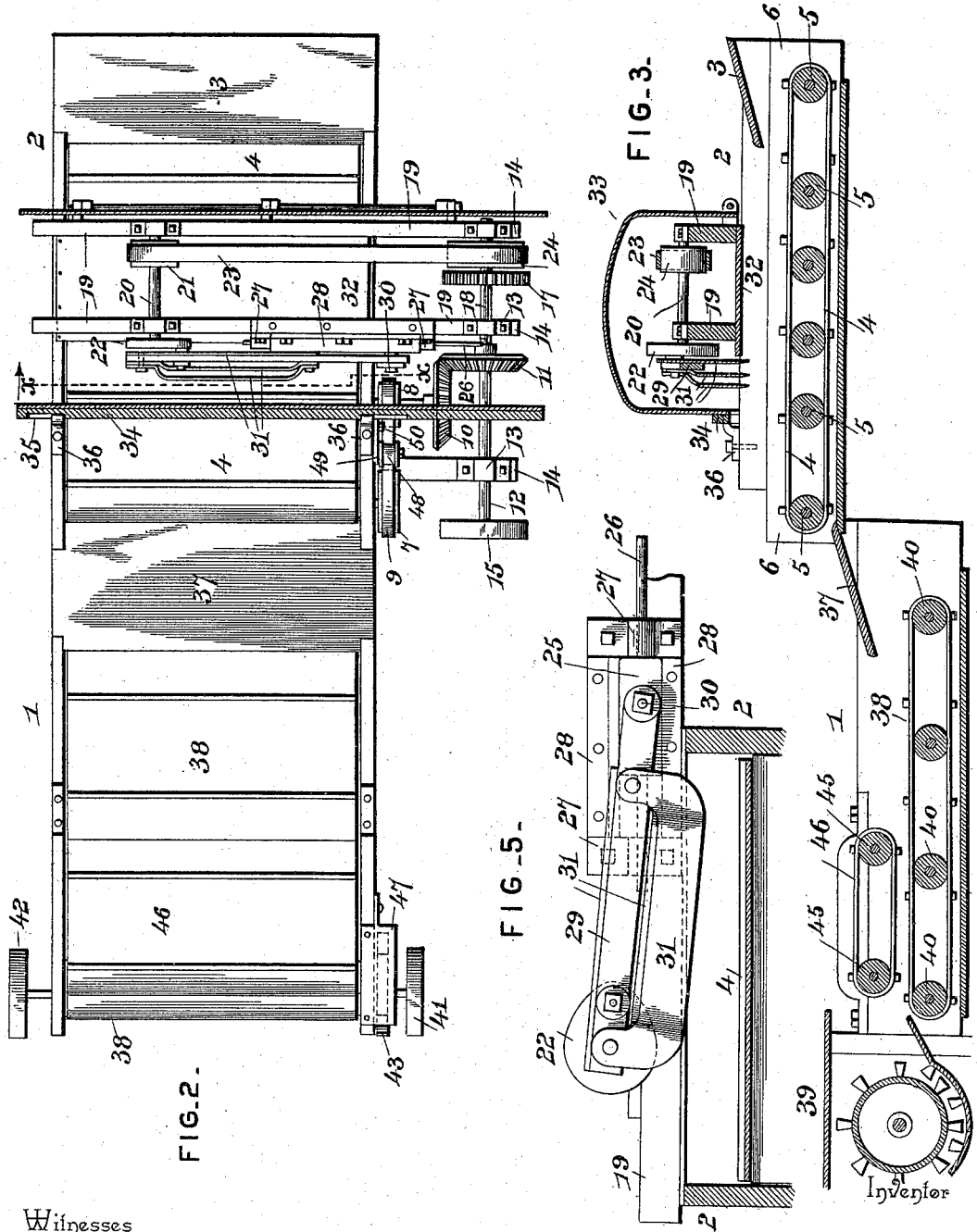

JOHN E. FISHER, OF FRANKFORT, OHIO.

BAND-CUTTER AND FEEDER.

SPECIFICATION forming part of Letters Patent No. 567,587, dated September 15, 1896.

Application filed October 18, 1895. Serial No. 566,110. (No model.)

*To all whom it may concern:*

Be it known that I, JOHN E. FISHER, a citizen of the United States, residing at Frankfort, in the county of Ross and State of Ohio, have invented a new and useful Band-Cutter and Feeder, of which the following is a specification.

This invention relates to certain new and useful improvements in provisions for feeding grain to threshing-machines and cutting the bands which bind the grain into sheaves or bundles, and aims to thoroughly loosen and lighten the grain and secure a positive feed thereof to the threshing-cylinder.

Other objects and advantages such as result from the peculiar construction of the apparatus will become apparent as the nature of the improvement is fully understood; and to this end the invention consists in certain details, novel features, and combinations of parts which hereinafter will be more particularly set forth, illustrated, and claimed.

An adaptation of the invention is shown in the accompanying drawings, although slight changes in the details, proportion, and arrangement of the parts may be resorted to without departing from the scope or nature of the invention, and in which—

Figure 1 is a perspective view of the improved band-cutter and feeder, the housing protecting the cutting apparatus and its actuating mechanism being partially open. Fig. 2 is a top plan view thereof, the said housing being broken away. Fig. 3 is a vertical central longitudinal section showing the invention applied. Fig. 4 is a detail view, partly in section, of the cutting apparatus. Fig. 5 is a detail section, about on the line X X of Fig. 2, showing the cutting apparatus in front elevation.

The same reference-numerals indicate corresponding and like parts in all the figures of the drawings.

The apparatus is composed of an inner section 1 and an outer section 2 of similar construction, and these two sections are secured together in any desired manner to admit of their separation or folding in order to reduce the size of the apparatus for storing, transporting, or for any other desired purpose. The outer section 2 is arranged in a higher plane than the inner section, and its receiving end is provided with an inclined board 3, forming a chute to receive and direct the bundles or gavels onto the apron or conveyer 4. The endless apron or conveyer 4 is of usual construction, and is supported at its ends and at points intermediate of its ends upon transversely-disposed rollers 5, which are journaled at their ends in the side pieces 6 of the frame comprising the section 2. The inner roller has a journal extending beyond a side piece 6 to receive a pulley 7, and the adjacent roller likewise has its journal extended at the same end and provided with a pulley 8, and a band or belt 9 connects the two pulleys 7 and 8, so as to transmit motion from one to the other. A bevel gear-wheel 10 is secured upon the outer end of the journal bearing the pulley 8, and meshes with a corresponding bevel-pinion 11, keyed upon a counter-shaft 12, journaled in pillow-bearings 13, secured upon the projecting ends of transverse beams 14. This counter-shaft is provided at one end with a pulley 15, which is driven from the separator or threshing-machine in any of the usual ways, and upon the counter-shaft is likewise secured a gear-wheel 16, which is in mesh with a corresponding gear-wheel 17 upon a short shaft 18, extending parallel with the counter-shaft and mounted in bearings provided at one end of transversely-arranged beams 19, placed above and secured to the side pieces 6. A companion shaft 20 is journaled in bearings near the opposite ends of the transverse beams 19 and extends parallel to the shaft 18, and is provided with a pulley 21 and a crank 22, the latter operating the cutting apparatus. A band 23 connects the pulley 21 with a corresponding pulley 24 on the shaft 18 and transmits motion from the latter shaft to the shaft 20. A reciprocating bar 25 has its end portions 26 reduced and rounded and operating through guide-blocks 27, and its middle portion is supported between parallel guides 28, secured to one of the transverse beams 19. A bar 29 is pivotally supported at one end upon a pin 30, projecting laterally from the reciprocating bar 25, and is mounted at its opposite end upon the wrist-pin of the crank 22, and this bar 29 receives at its outer end a gyratory movement which results in imparting to the bar in its entirety a combined vertical and reciprocating motion, so as to cause the knives 31, attached thereto, to enter between the grain in their forward movement and leave the same when returning to a starting-point. The knives 31 will be provided in series and disposed in parallel relation, and will be spaced a proper distance apart, so as to insure their action upon the band or binder of the bundles, and there will be as many of these knives as desired to attain the required end. The foremost knife of the series will be a single blade extending to the top edge of the bar 29, whereas the remaining blades will be narrow and their end portions will extend vertically and be deflected toward the bar 29, so as to receive the fastenings by means of which the said knives are secured to their supporting-bar 29. A plate 32 closes the space between the transverse beams 19 and is attached to the lower side thereof and projects beyond the transverse beam having the guides 28 a sufficient distance to protect the reciprocating bar 25 and the crank 22, and serves to prevent the grain from banking between the said transverse beams 19 and interfering with the actuating mechanism of the cutting apparatus. A housing 33 closes the upper portion of the cutting apparatus, its mountings, and actuating mechanism, and is hinged at one side to one of the transverse beams 19, and its opposite side is provided with a cleat 34, which is notched at 35 to receive the ends of turn-buttons 36, provided on the side pieces 6, to hold the housing in closed relation. This housing is preferably constructed of sheet metal, which is bent or deflected between its edges, so as to secure the desired protection for the parts covered thereby.

The inner section 1 is provided at the end contiguous to the outer section with an incline 37, which receives the grain from the apron 4 and directs it onto the apron or conveyer 38, by means of which it is moved directly to the cylinder of the threshing-machine 39. This apron or conveyer 38 may be of any approved and desired construction, and is mounted at its ends and intermediate points upon rollers 40, and is positively rotated by power applied to one of the end rollers, the latter having its journals extended and provided with band-pulleys 41 and 42, and one of the journals having a pinion 43, which meshes with a corresponding pinion 44 on the journal of one of the rollers 45, placed above the apron 38, and which support an apron 46 of similar construction to the apron 38 and acting jointly with the latter to secure a positive feed of the grain to the threshing-machine. The pinions 43 and 44 are protected by a housing 47 to prevent the lodgment of dust and grain thereon. Each of the sections has its frame closed on its lower side to afford protection to the aprons and prevent persons from coming in contact therewith. The various bands for transmitting motion to the operating parts may be tightened in any of the usual ways and may be leather belts or sprocket-chains, as commonly employed in machinery. The band 9 is tightened by means of a pulley 48, mounted upon a spindle carried by a slotted bracket 49, adjustably connected to a side piece 6 of the frame by means of a bolt or fastening 50.

The bundles or sheaves are fed upon the inclined board or chute 3 and gravitate to the apron or conveyer 4, and are advanced by the latter to the cutting apparatus, which latter severs the bands and scatters and loosens the grain, which latter is advanced and deposited upon the inner section, which moves it toward and delivers it to the threshing-machine. The cutting apparatus operating parallel with the length of the grain loosens and separates the latter, which is a decided advantage in wet and damp grain, inasmuch as the latter is prevented from being fed or supplied to the thresher in bunches, thereby obviating choking of the threshing-cylinder. The intermediate rollers supporting the upper portion of the apron 4 sustain the said apron against the action of the cutting apparatus and enable the said apron to be made of lighter material than would be possible if the intermediate supporting-rollers were dispensed with.

Having thus described the invention, what is claimed as new is—

1. In a band-cutter and feeder, the combination of a knife-bar, a reciprocating bar having pivotal connection with one end of the knife-bar to impart a corresponding reciprocating movement thereto, and a rotatable crank having connection with the opposite end of the knife-bar to give a gyratory movement thereto, substantially in the manner set forth for the purpose described.

2. In a band-cutter and feeder, the combination with an endless conveyer, of a knife-bar disposed at right angles to the movement of the said conveyer, actuating mechanism for imparting to the knife-bar a reciprocating movement at one end and a gyratory motion at the opposite end, and a series of knives disposed in parallel relation and secured to the said knife-bar, the front knife of the series occupying the space from the top edge of the knife-bar to its cutting edge and the remaining knives being narrow and having vertical extensions at their ends which are deflected toward and are secured to the said knife-bar, substantially as specified.

3. In a band-cutter and feeder, the combination of a conveyer, a knife-bar disposed transversely of the conveyer and having a series of knives extending in parallel relation and spaced a distance apart, a reciprocating bar having pivotal connection with one end of the knife-bar, side and end guides for the reciprocating bar to direct it in its traversing movements, a shaft having a crank to which the opposite end of the knife-bar is attached, and means for rotating the crank whereby one end of the knife-bar receives a gyratory movement and the opposite end a reciprocating movement, substantially as shown and described.

In testimony that I claim the foregoing as my own I have hereto affixed my signature in the presence of two witnesses.

JOHN E. FISHER.

Witnesses:
M. D. VORHEES,
D. L. SUTHERLAND.